United States Patent
Horinouchi et al.

(10) Patent No.: US 12,280,394 B2
(45) Date of Patent: Apr. 22, 2025

(54) COATING DIE, COATING DEVICE, COATING METHOD, AND METHOD FOR MANUFACTURING SECONDARY CELL

(71) Applicant: VEHICLE ENERGY JAPAN INC., Ibaraki (JP)

(72) Inventors: Tetsuya Horinouchi, Kanagawa (JP); Takashi Kashimura, Kanagawa (JP)

(73) Assignee: VEHICLE ENERGY JAPAN INC., Ibaraki (JP)

( * ) Notice: Subject to any disclaimer, the term of this patent is extended or adjusted under 35 U.S.C. 154(b) by 0 days.

(21) Appl. No.: 18/503,292

(22) Filed: Nov. 7, 2023

(65) Prior Publication Data

US 2024/0066547 A1 Feb. 29, 2024

Related U.S. Application Data

(62) Division of application No. 17/494,076, filed on Oct. 5, 2021, now Pat. No. 11,850,627, which is a division
(Continued)

(30) Foreign Application Priority Data

Feb. 3, 2017 (JP) .................. 2017-018105

(51) Int. Cl.
  *B05C 5/02* (2006.01)
  *B05D 1/26* (2006.01)
  *B05D 1/34* (2006.01)
  *B32B 37/20* (2006.01)
  *H01M 4/04* (2006.01)
(Continued)

(52) U.S. Cl.
  CPC ............... *B05C 5/027* (2013.01); *B05D 1/26* (2013.01); *B05D 1/34* (2013.01); *B32B 37/20* (2013.01); *H01M 4/0404* (2013.01); *H01M 4/139* (2013.01); *H01M 10/0404* (2013.01); *H01M 10/058* (2013.01); *B32B 2457/10* (2013.01)

(58) Field of Classification Search
  None
  See application file for complete search history.

(56) References Cited

U.S. PATENT DOCUMENTS

| 4,476,165 A | 10/1984 | McIntyre |
| 5,643,363 A | 7/1997 | Hosogaya et al. |

(Continued)

FOREIGN PATENT DOCUMENTS

| CN | 1593787 A | 3/2005 |
| CN | 102576846 A | 7/2012 |

(Continued)

OTHER PUBLICATIONS

U.S. Appl. No. 17/494,076 (US Publication No. 2022/0062944 A1), Oct. 5, 2021 (Mar. 3, 2022).

(Continued)

Primary Examiner — Michael P. Rodriguez
(74) Attorney, Agent, or Firm — Baker Botts L.L.P.

(57) ABSTRACT

Provided is a coating die enabling coating of two layers of coating films stably. The coating die includes: a first block including a first manifold to receive a first coating liquid; a second block including a second manifold to receive a second coating liquid; and a shim sandwiched between the first block and the second block.

4 Claims, 17 Drawing Sheets

Related U.S. Application Data of application No. 16/481,914, filed as application No. PCT/JP2018/003403 on Feb. 1, 2018, now Pat. No. 11,642,692.

(51) Int. Cl.
  *H01M 4/139* (2010.01)
  *H01M 10/04* (2006.01)
  *H01M 10/058* (2010.01)

(56) References Cited

U.S. PATENT DOCUMENTS

| | | |
|---|---|---|
| 2009/0162595 A1 | 6/2009 | Ko et al. |
| 2011/0259505 A1 | 10/2011 | Lee et al. |
| 2012/0225211 A1 | 9/2012 | Kuniyasu |
| 2012/0308755 A1 | 12/2012 | Gorman et al. |
| 2014/0050883 A1 | 2/2014 | Hanschen et al. |
| 2018/0175365 A1* | 6/2018 | Ueda ................. H01M 4/139 |

FOREIGN PATENT DOCUMENTS

| | | | |
|---|---|---|---|
| CN | 103056066 A | | 4/2013 |
| JP | 07-256189 A | | 10/1995 |
| JP | 11226469 A | * | 8/1999 |
| JP | H11-226469 A | | 8/1999 |
| JP | 2001-170543 A | | 6/2001 |
| JP | 2005-270704 A | | 10/2005 |
| JP | 2011-062401 A | | 3/2011 |
| JP | 2012-183452 A | | 9/2012 |

OTHER PUBLICATIONS

U.S. Appl. No. 17/494,076, Sep. 13, 2023 Notice of Allowance.
U.S. Appl. No. 17/494,076, Aug. 1, 2023 RCE.
U.S. Appl. No. 17/494,076, Jul. 18, 2023 Advisory Action.
U.S. Appl. No. 17/494,076 Jun. 12, 2013 Response to Final Office Action.
U.S. Appl. No. 17/494,076 Mar. 14, 2013 Final Office Action.
U.S. Appl. No. 17/494,076, Dec. 5, 2022 Response to Non-Final Office Action.
U.S. Appl. No. 17/494,076, Oct. 5, 2022 Non-Final Office Action.
Chinese Office Action, issued Jul. 31, 2020, for Chinese Application No. 201880008157.5 (with English translation).
Communication pursuant to Article 94(3) EPC, dated Nov. 4, 2021, for European Application No. 18 748 472.0.
Extended European Search Report, issued Dec. 9, 2020, for European Application No. 18748472.0.
International Search Report, mailed May 1, 2018, which issued during the prosecution of International Application No. PCT/JP2018/003403, which corresponds to the present application.
Machine Translation of CN 100542685C (published as CN 1593787 A).
Machine Translation of CN 103056066 A.
Machine Translation of JP 2001-170543 A.

* cited by examiner t 0.5mm　　w 100mm　L 50mm　　Φ 0.5mm　$P_t$ 10mm　　$\triangle$P 1kPa

COATING DIE, COATING DEVICE, COATING METHOD, AND METHOD FOR MANUFACTURING SECONDARY CELL

TECHNICAL FIELD

The present invention relates to a coating die for coating on a film or on metal foil, the coating die being configured to concurrently apply two layers of different types of liquids, and relates to such a coating device, coating method, and method for manufacturing a secondary cell using such a coating die.

BACKGROUND ART

A coating device has been known, which forms a thin coating film on a roll-type film, for example. To form a laminated-structured coating film of a plurality of layers on a film using such a coating device, the coating of a single layer at one time requires a plurality of coating devices and coating dies, and so increases the cost. This sector for coating on a film therefore needs a coating device enabling the coating of a plurality of layers concurrently. A known technique described in Patent Document 1, for example, describes the coating of two layers of coating liquids concurrently on a substrate, such as an elongated film or metal foil, using a coating die while continuously feeding such a substrate. This document discloses the structure for coating, including upper and lower die blocks each having a manifold to feed a coating liquid. The structure includes a divider plates between the upper and lower die blocks and sandwiching a shim between these divider plates to determine the coating width.

CITATION LIST

Patent Literature

Patent Literature 1: JP 2005-270704 A

SUMMARY OF INVENTION

Technical Problem

When the operator assembles such a coating die, the technique of Patent Document 1 requires the operator to adjust the position of the coating die in the transverse direction to align the forward end of the coating die and to adjust the position of the coating die in the longitudinal direction to align the coating positions of the two layers in the longitudinal direction. Such adjustment may be the job with micron-order accuracy. In this case, a small displacement adversely affects the coating result, and so it takes a long time for the operator to assemble the coating die and adjust the position of the coating die. Such positioning manually performed degrades the repeatability of the job. Specifically a displacement of the two layers in the coating film in the longitudinal direction of the coating die may fail to achieve the desired performance. For use in a lithium-ion cell, for example, such a displacement, even if it is small, has to be avoided because the lithium-ion cell includes these films, each having the laminate of coating films, that are stacked before packing.

The present invention aims to provide a coating die enabling the coating of two layers of coating film stably, and such a coating device, coating method, and method for manufacturing a secondary cell using such a coating die.

Solution to Problem

To achieve the aim, a coating die according to one embodiment of the present invention includes: a first block including a first manifold to receive a first coating liquid; a second block including a second manifold to receive a second coating liquid; and a shim sandwiched between the first block and the second block. The shim including a first recess on a face of the shim facing the first block, the first recess communicating with the first manifold, and a second recess on a face of the shim facing the second block, the second recess communicating with the second manifold. The first recess has one end in a direction orthogonal to a stacking direction of the first block, the shim and the second block and orthogonal to a longitudinal direction of the shim, the one end being open to define a first discharge slot to discharge the first coating liquid, and the second recess has one end in the direction of the one end of the first recess, the one end of the second recess being open to define a second discharge slot to discharge the second coating liquid.

One embodiment of the present invention includes recesses on both faces of the shim. This eliminates the positioning between the upper layer and the lower layer during assembling of the coating die, and so reduces the number of assembly steps and improves the positioning accuracy of the two-layered coating film.

DESCRIPTION OF EMBODIMENTS

The following describes some embodiments of a coating die according to the present invention, with reference to the attached drawings.

First Embodiment

Figure 1:
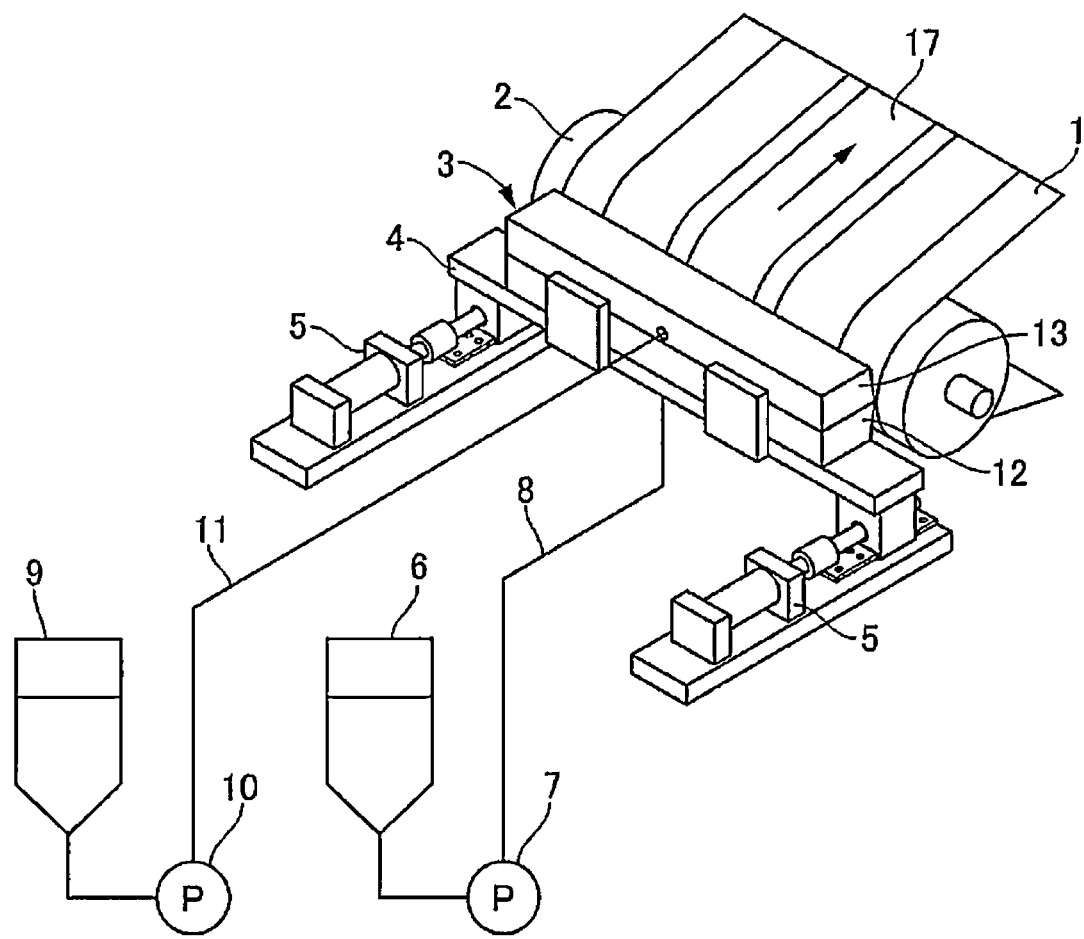
FIG. 1 schematically shows a coating device that is a first embodiment.
Figure 2:
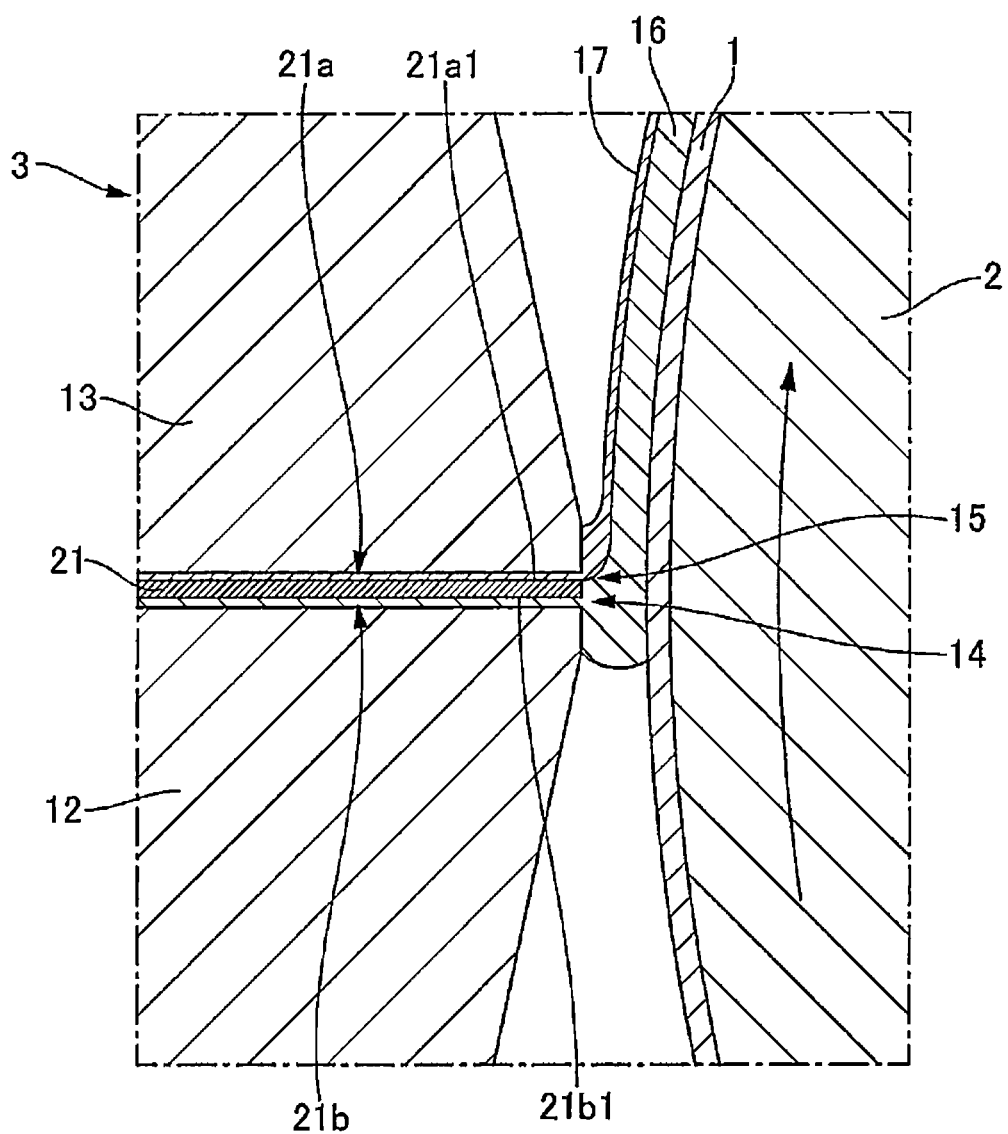
FIG. 2 is an enlarged cross-sectional view showing the relationship between a two-layer coating die and a substrate in the first embodiment.

FIG. 1 schematically shows a coating device including a two-layer coating die that is a first embodiment. FIG. 2 is an enlarged cross-sectional view showing the relationship between the two-layer coating die and a substrate in the first embodiment. The coating device includes: a two-layer coating die 3 having a lower block 12 and an upper block 13; a back roll 2 opposed to the two-layer coating die 3, around the back roll, a belt-like substrate 1 being wound to be a roll; a plurality of adjustment rolls (not illustrated) to adjust the tension of the substrate 1 during conveyance; a drying oven (not illustrated) to dry the coating liquid; and a wind-up roll (not illustrated) to rewind the substrate 1 after coating. The two-layer coating die 3 is removably attached to a die base 4. The die base 4 has a pair of die drive units 5 to adjust the relative position between the two-layer coating die 3 and the back roll 2. A lower-layer coating-liquid tank 6 contains a coating liquid like slurry including an active material for a lithium-ion cell, for example, and an upper-layer coating liquid tank 9 contains a coating liquid including a ceramic material, for example, having a function as a heat-resistant material.

These coating liquids are pressure-fed by pumps 7 and 10, which are metering pumps, to the lower block 12 and the upper block 13 of the two-layer coating die 3 via lower-layer feeding tube 8 and upper-layer feeding tube 11, respectively. The coating liquids discharged from the two-layer coating die 3 are applied to the surface of the substrate 1 to form a lower coating film 16 and an upper coating film 17. The coating device includes a (not-illustrated) control unit CU. The control unit CU controls various conditions, including the rotation of the rolls, the output of the pumps, the operating state of the pair of die drive units 5, and the conditions of the drying oven.

As shown in FIG. 2, the two-layer coating die 3 according to the first embodiment includes an integrated shim 21 sandwiched between the lower block 12 and the upper block 13. The lower block 12, the integrated shim 21, and the upper block 13 define slit-like lower-layer discharge slot 14 and upper-layer discharge slot 15. These lower-layer and upper-layer discharge slots 14 and 15 discharge different types of coating liquids to form the lower-layer coating film 16 and the upper-layer coating film 17 as a two-layered structure on the substrate 1 wound around the back roll 2. Hereinafter the lower-layer discharge slot 14 and the upper-layer discharge slot 15 may be collectively called a discharge slot.

Figure 3:
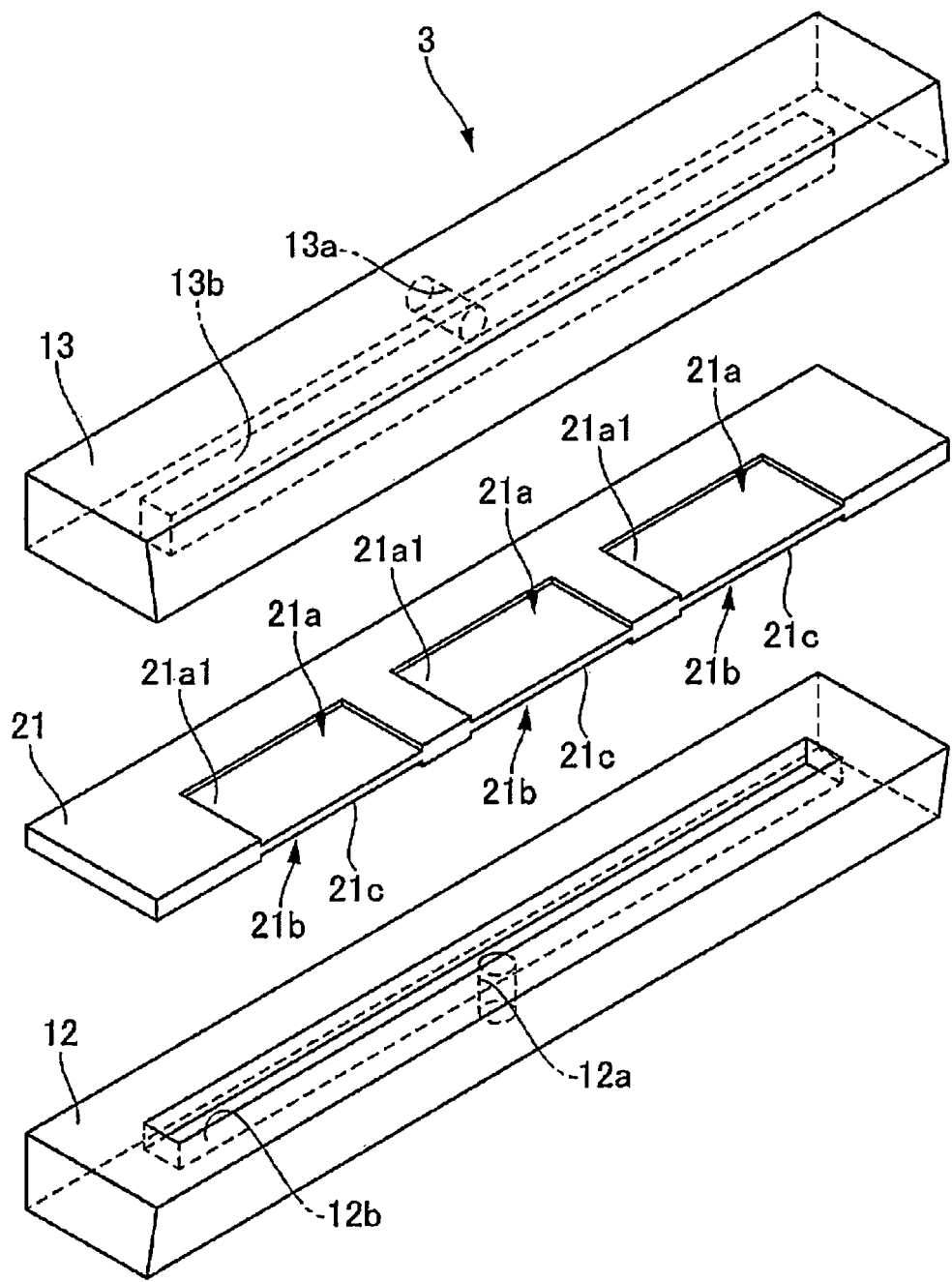
FIG. 3 is an exploded perspective view of the two-layer coating die in the first embodiment.
Figure 4:
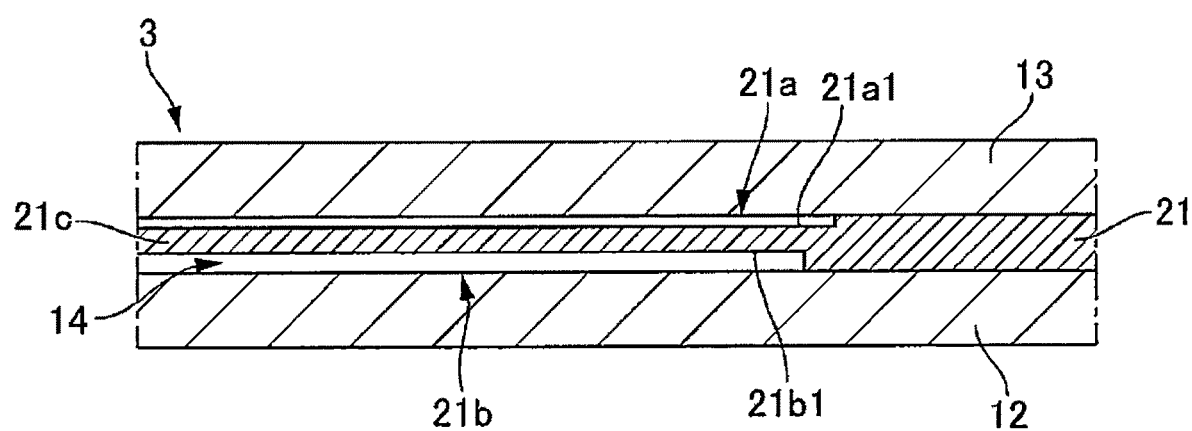
FIG. 4 is an enlarged view of a discharging slot of the two-layer coating die in the first embodiment.

FIG. 3 is an exploded perspective view of the two-layer coating die in the first embodiment. FIG. 4 is an enlarged view of a discharge slot of the two-layer coating die in the first embodiment. The lower block 12 has a groove-like lower-layer manifold 12b and a lower-layer coating liquid feeding port 12a. The lower-layer manifold 12b is on the face opposed to the upper block 13 and extends in the longitudinal direction. The lower-layer coating liquid feeding port 12a penetrates through a substantially center of the lower block 12 in the longitudinal direction, and connects the lower-layer manifold 12b and the lower-layer feeding tube 8. The upper block 13 has a groove-like upper-layer manifold 13b and an upper-layer coating liquid feeding port 13a. The upper-layer manifold 13b is on the face opposed to the lower block 12 and extends in the longitudinal direction. The upper-layer coating liquid feeding port 13a penetrates through a substantially center of the upper block 13 in the longitudinal direction, and connects the upper-layer manifold 13b and the upper-layer feeding tube 11.

As shown in FIG. 3 and FIG. 4, the integrated shim 21 is a single piece having upper-layer recesses 21a, lower-layer recesses 21b, and dividing parts 21c dividing these recesses 21a and 21b. The upper-layer recesses 21a and the lower-layer recesses 21b are disposed so as to be substantially opposed on the surface and the rear face of the integrated shim 21. That is, the upper-layer recesses 21a and the lower-layer recesses 21b are disposed on the mutually opposite sides relative to the dividing parts 21c. This avoids the displacement between the upper-layer coating film and the lower-layer coating film in the longitudinal direction. These lower-layer recesses 21b and upper-layer recesses 21a have a pattern formed by etching. This suppresses the displacement of a part other than the recesses, especially of the dividing parts 21c, due to stress during the processing so as to keep a stable shape of the recesses, and stabilizes the thickness of the upper-layer and lower-layer coating films.

In the first embodiment, the lower-layer recesses 21b are deeper than the upper-layer recesses 21a. The lower-layer coating liquid has viscosity larger than that of the upper-layer coating liquid, and such a configuration for the depth is to increase the channel volume for the coating liquid in the lower-layer recesses and so reduce the load on the pump output. Depending on some target thickness ratios between the upper layer and the lower layer, the depth of the upper-layer recesses 21a may be the same as the depth of the lower-layer recesses 21b, or conversely the depth of the upper-layer recesses 21a may be larger than the depth of the lower-layer recesses 21b.

In the integrated shim 21, the plate-like dividing parts 21c having the upper-layer recess bottom faces 21a1 and the lower-layer recess bottom faces 21b1 play a role as a divider between the upper-layer coating liquid and the lower-layer coating liquid. Desirably the thickness of these dividing parts 21c is as small as possible. Too thick dividing parts 21c degrade the uniformity of the coating film of the upper layer that is overlaid on the lower layer.

As shown in FIG. 4, the upper-layer recess 21a of the first embodiment has a longitudinal width larger than that of the lower-layer recess 21b. This is to cover the longitudinal ends of the lower-layer coating film with the upper-layer coating film. Especially for the use in a lithium-ion cell, the two-layered coating film on the substrate 1 includes an active material at the lower layer and a heat-resistant layer at the upper layer, and such a substrate 1 is made in a roll or these substrates 1 are stacked in the laminar form for use. When these substrates are stacked without covering the lower-layer coating films with the upper-layer coating films, this may cause short-circuit or may degrade the cell performance due to heat. Since the upper-layer recesses 21a and the lower-layer recesses 21b having the pattern formed by etching determine the longitudinal positional relationship between the coating films, such a positional relationship between the upper-layer coating film and the lower-layer coating film is very precise, and so the resultant lithium-ion cell operates stably.

Depending on the purposes, the width may be the same between the upper-layer coating film and the lower-layer coating film, or conversely the width of the upper-layer coating film may be smaller than the width of the lower-layer coating film, or the upper-layer coating film may be formed at a part of the width of the lower-layer coating film. In such cases, the positional relationship between the upper-layer recesses 21a and the lower-layer recesses 21b may be changed as needed.

The followings are the functions and the advantageous effects of the two-layer coating die 3 in the first embodiment as stated above.

(1) The two-layer coating die 3 (coating die) is configured to discharge a coating liquid on the belt-like substrate 1 (substrate to be coated) that moves in the longitudinal direction (i.e., the winding-up direction of the substrate 1). The two-layer coating die 3 includes the upper block 13 (first block) having the upper-layer manifold 13b (first manifold) to receive a first coating liquid, and the lower block 12 (second block) having the lower-layer manifold 12b (second manifold) to receive a second coating liquid, and the integrated shim 21 (shim) sandwiched between the upper block 13 and the lower block 12 to define the upper-layer discharge slot 15 (first discharge slot) and the lower-layer discharge slot 14 (second discharge slot) to discharge the coating liquids. The integrated shim 21 includes the upper-layer recesses 21a (first recesses) and the lower-layer recesses 21b (second recesses) on the surface and the rear face, and peripheral parts other than the edges of the recesses facing the upper-layer discharge slot 15 and the lower-layer discharge slot 14, the recesses defining a part of the passage channel of the coating liquids. That is, the upper-layer recesses 21a are open on one end of the integrated shim 21 in the transverse direction (transverse direction of the coating die) and communicate with the upper-layer manifold 13b. This forms the upper-layer discharge slot 15 to discharge the first coating liquid. The transverse direction of the integrated shim 21 refers to the direction orthogonal to the stacking direction of the upper block 13, the integrated shim 21 and the lower block 12 (stacking direction of the coating die) and to the longitudinal direction of the integrated shim 21 orthogonal to the stacking direction (longitudinal direction of the coating die). The lower-layer recesses 21b are open in the same direction as that of the upper-layer recesses 21a, and communicate with the lower-layer manifold 12b. This forms the lower-layer discharge slot 14 to discharge the second coating liquid.

In this way, the integrated shim 21 has the upper-layer recesses and the lower-layer recesses on the surface and the rear face. This eliminates the positioning that is necessary for a coating die including the upper-layer shim and the lower-layer shim, and so reduces the number of assembly steps and improves the positioning accuracy between the upper-layer coating film and the lower-layer coating film.

Second Embodiment

Figure 5:
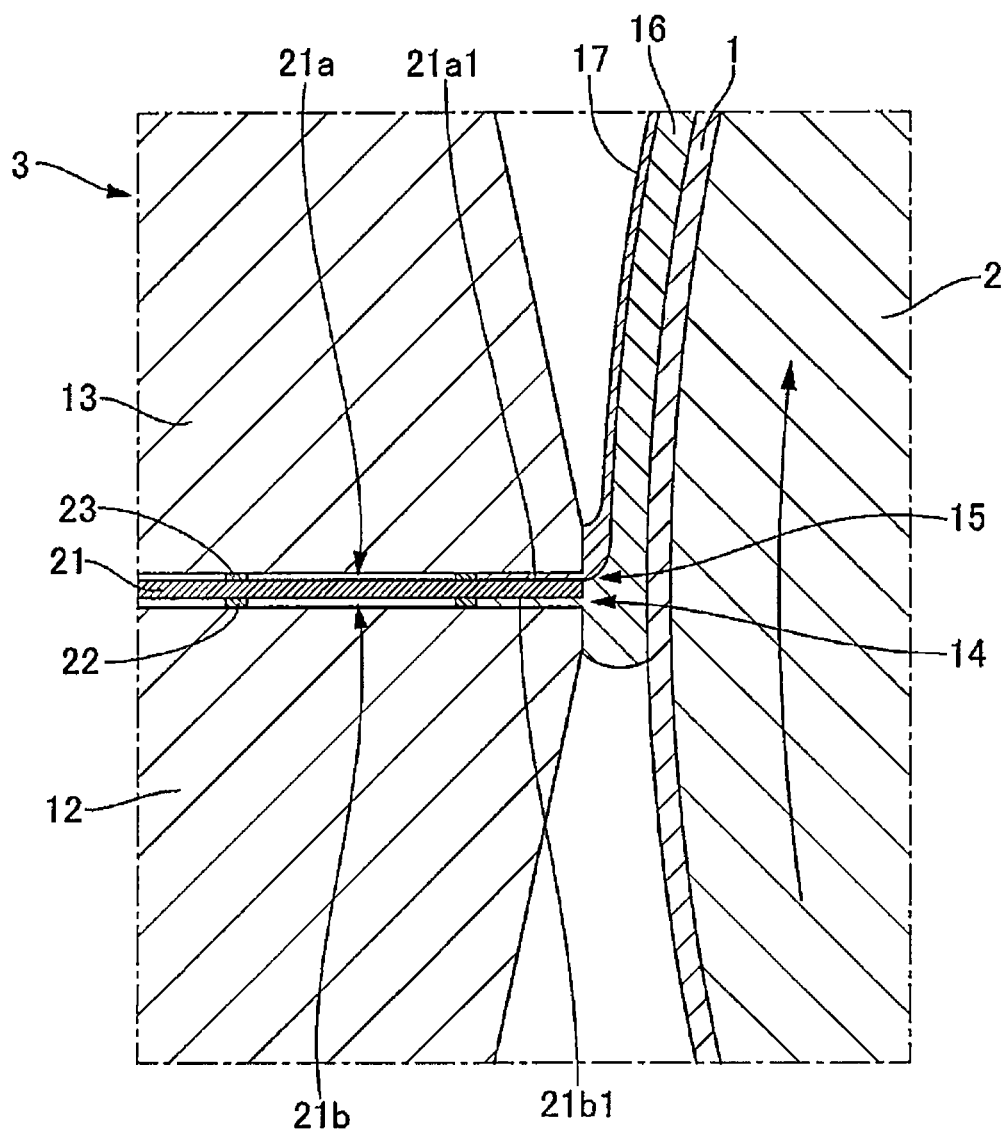
FIG. 5 is an enlarged cross-sectional view showing the relationship between a two-layer coating die and a substrate in a second embodiment.

Next the following describes a second embodiment. FIG. 5 is an enlarged cross-sectional view showing the relationship between a two-layer coating die and a substrate in a second embodiment. Similarly to the two-layer coating die according to the first embodiment, the two-layer coating die according to the second embodiment includes an integrated shim 21 sandwiched between a lower block 12 and an upper block 13. The lower block 12, the integrated shim 21, and the upper block 13 define slit-like lower-layer discharge slot 14 and upper-layer discharge slot 15. These lower-layer and upper-layer discharge slots 14 and 15 discharge two types of coating liquids to form a lower-layer coating film 16 and an upper-layer coating film 17 as a two-layered structure on a substrate 1 wound around a back roll 2.

Figure 6:
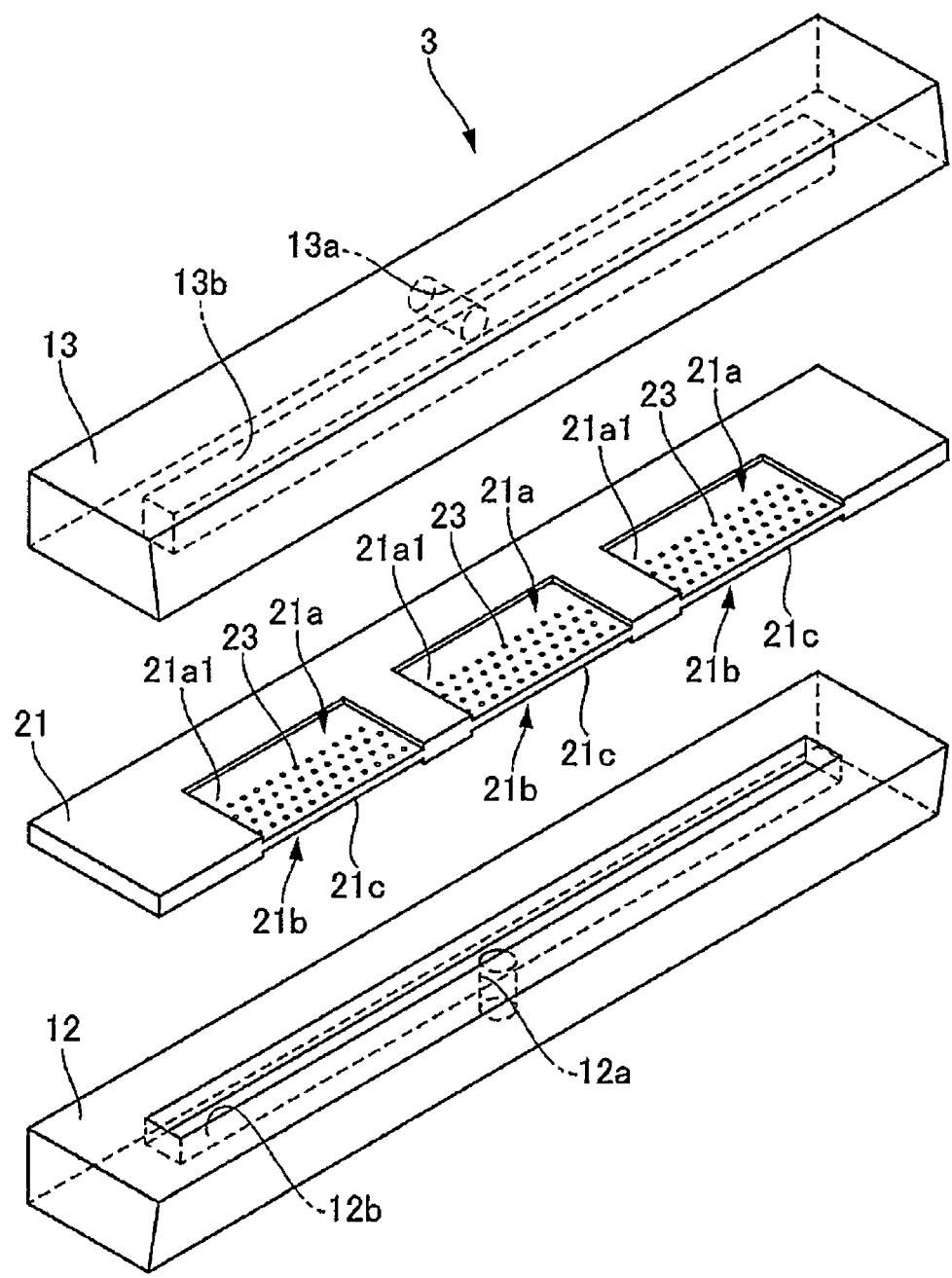
FIG. 6 is an exploded perspective view of the two-layer coating die in the second embodiment.
Figure 7:
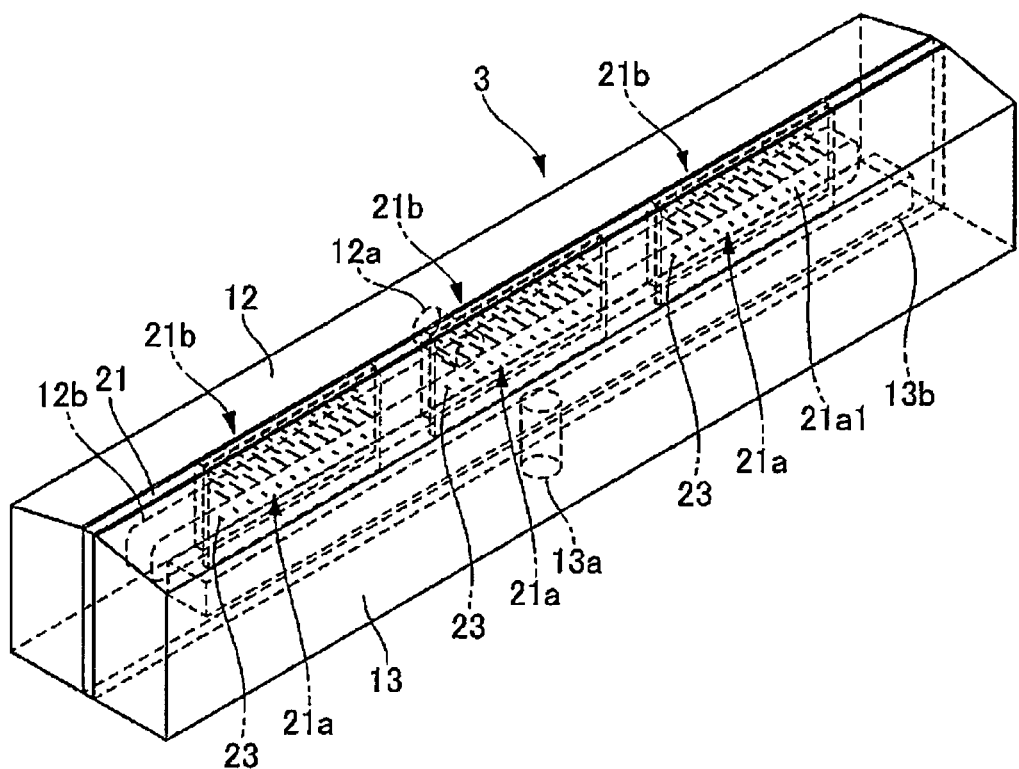
FIG. 7 is a perspective view of the two-layer coating die in the second embodiment.
Figure 8:
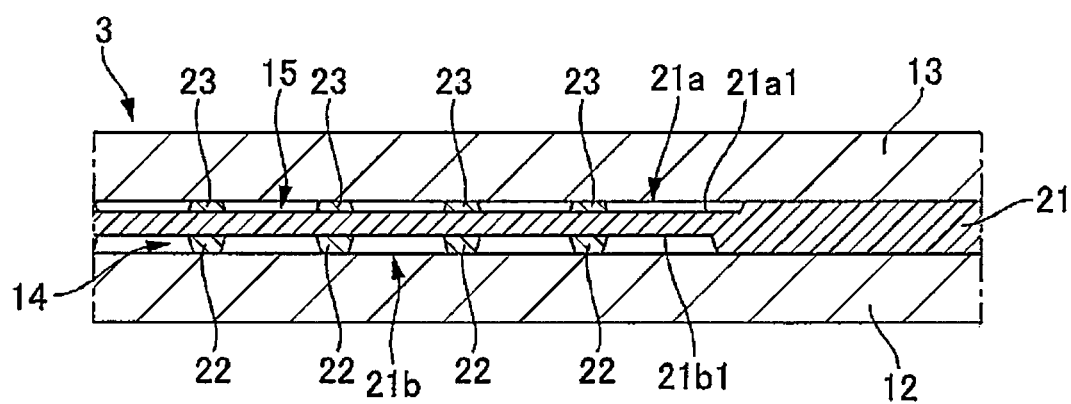
FIG. 8 is an enlarged view of a discharging slot of the two-layer coating die in the second embodiment.

FIG. 6 is an exploded perspective view of the two-layer coating die in the second embodiment. FIG. 7 is a perspective view of the two-layer coating die in the second embodiment. FIG. 8 is an enlarged view of a discharge slot of the two-layer coating die in the second embodiment.

The lower block 12 has a groove-like lower-layer manifold 12b and a lower-layer coating liquid feeding port 12a. The lower-layer manifold 12b is on the face opposed to the upper block 13 and extends in the longitudinal direction. The lower-layer coating liquid feeding port 12a penetrates through a substantially center of the lower block 12 in the longitudinal direction, and connects the lower-layer manifold 12b and the lower-layer feeding tube 8. The upper block 13 has a groove-like upper-layer manifold 13b and an upper-layer coating liquid feeding port 13a. The upper-layer manifold 13b is on the face opposed to the lower block 12 and extends in the longitudinal direction. The upper-layer coating liquid feeding port 13a penetrates through a substantially center of the upper block 13 in the longitudinal direction, and connects the upper-layer manifold 13b and the upper-layer feeding tube 11.

As shown in FIG. 6, FIG. 7 and FIG. 8, the integrated shim 21 has upper-layer recesses 21a and lower-layer recesses 21b, and these upper-layer recesses 21a and lower-layer recesses 21b are substantially opposed on the surface and the rear face of the integrated shim 21. As shown in FIG. 8, these lower-layer recesses 21b and upper-layer recesses 21a have a plurality of lower-layer projections 22 and upper-layer projections 23 on their bottom faces 21b1 and 21a1, respectively. Each of the lower-layer projections 22 and the upper-layer projections 23 has a trapezoidal shape in axial cross section, where the width of the trapezoid is smaller at the distal end than at the proximal end. These lower-layer recesses 21b, the upper-layer recesses 21a, the lower-layer projections 22 and the upper-layer projections 23 have a pattern formed by etching. A part other than the surface region to be the projections and the surface region as the periphery of the recesses are dissolved with a predetermined chemical to form these recesses and projections. In other words, the height of the lower-layer projections 22 is substantially the same as the depth of the lower-layer recesses 21b, and the height of the upper-layer projections 23 is substantially the same as the depth of the upper-layer recesses 21a.

Sandwiching the integrated shim 21 between the upper block 13 and the lower block 12 brings the distal ends of the lower-layer projections 22 and the upper-layer projections 23 into contact with the end faces of the corresponding blocks, and so the lower-layer projections and the upper-layer projections function as supporting pillars to support the dividing parts 21c to be flat between the blocks. For illustrative purposes, the drawings illustrate the thickness of the integrated shim 21 is thicker than the actual thickness. Actually the integrated shim 21 has the thickness at a part other than the recesses of 1 mm, the depth of the upper-layer recesses 21a of 0.2 mm, the depth of the lower-layer recesses 21b of 0.3 mm, and the thickness of the dividing parts 21c of 0.5 mm, for example.

Figure 9:
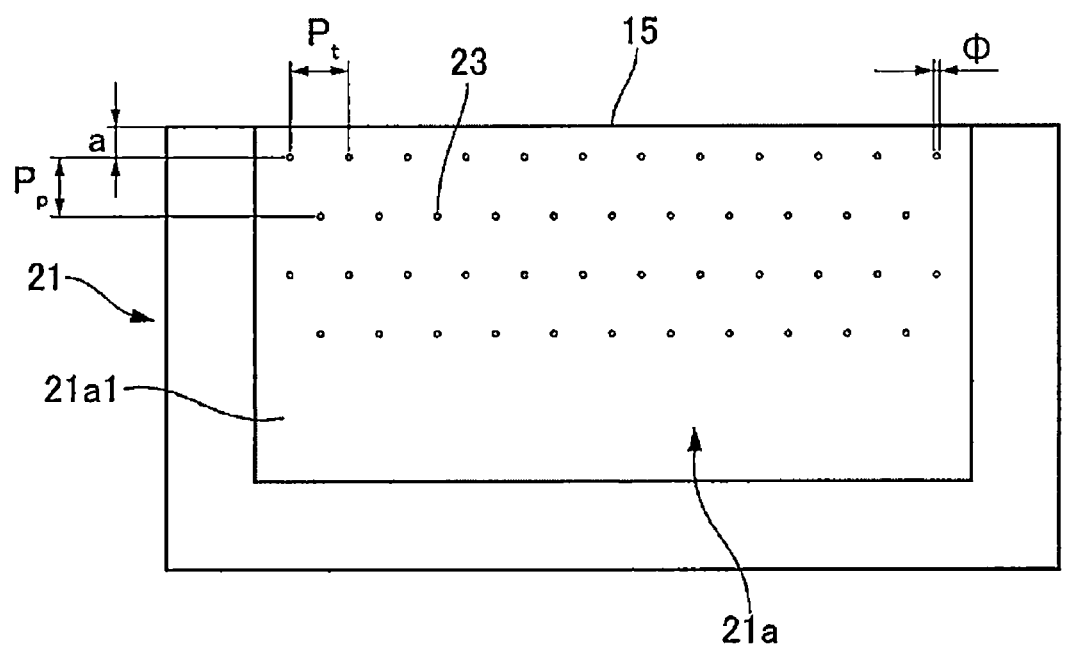
FIG. 9 is an enlarged plan view of the arrangement of projections in one of the recesses of the integrated shim in the second embodiment.

The following describes the lower-layer projections 22 and the upper-layer projections 23 formed in the lower-layer recesses 21b and the upper-layer recesses 21a, respectively, in more details. In the following, the lower-layer recesses 21b and the upper-layer recesses 21a simply may be collectively called recesses. The lower-layer projections 22 and the upper-layer projections 23 simply may be collectively called projections. FIG. 9 is an enlarged plan view of the arrangement of the projections in one of the recesses of the integrated shim in the second embodiment. For convenience sake, FIG. 9 shows the recess for the upper layer, and the lower-layer recess also is similarly formed on the rear face. The recess of the integrated shim 21 is configured as a slit of the die, and has the periphery on three sides other than the edge facing the discharge slot. This periphery on three sides is closed by the standing wall of the integrated shim 21. In the recess, a plurality of projections are aligned horizontally in a plurality of lines (four lines in FIG. 9), and the projections in a first horizontal line are formed at a predetermined distance a from the edge facing the discharge slot to have the interval Pt between the adjacent projections. The plurality of projection lines have intervals Pp while arranging the projections in a staggered manner.

The distance a from the opening end of the recess, the interval Pt of the projections, and the interval Pp between the projection lines are desirably small from the viewpoint of suppressing the displacement. Note here that the flowing of coating liquid is disturbed around the projections, and a too small distance a from the opening end may fail to solve such disturbance of the flowing just before the discharging. In that case, the thickness of the coating film will vary in the width direction. A too small interval Pt of the projections causes the interference of the flowing disturbance between the adjacent projections, which may result in a larger flowing disturbance. A too small interval Pp of the projection lines causes a disturbance of the coating liquid flow at a projection in a certain line not to be solved before the following line and to be disturbed more at the following line. This degrades the flow-rate distribution of the coating liquid in the width direction toward the discharge slot, and so the thickness of the coating film will vary in the width direction. To solve these problems of the flowing disturbance, a preferable distance a from the opening end of the recess, interval Pt of the projections, and interval Pp between the projection lines are set desirably. Specifically since the flowing disturbance will change with the viscosity of the coating liquid, the volumetric flow rate of the coating liquid, the shape of the projections, and the size of the projections, these dimensions are desirably determined based on the fluid analysis so that the coating liquid is discharged stably.

Figure 12:
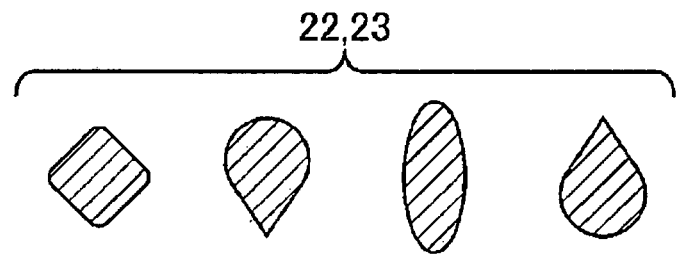
FIG. 12 shows several types of the cross-sectional shape of the projections in the second embodiment.

The projections have a shape that is narrower toward the distal end, and have a circular cross section in the direction orthogonal to the axis. That is, each projection decreases in diameter Φ toward the distal end. Such a cross-sectional shape in the direction orthogonal to the axis of the lower-layer projections 22 and the upper-layer projections 23 is not limited to a circle, which may have various shapes. FIG. 12 shows specific examples of the cross-sectional shape of the projection in the direction orthogonal to the axis. As shown in FIG. 12, the shapes include a diamond shape, a raindrop shape and a rugby-ball shape other than a circle, which may be selected freely.

The lower-layer projections 22 and the upper-layer projections 23 on the surface and the rear face are desirably overlapped at the same perpendicular position of the flat face of the integrated shim 21. Complete overlapping of the lower-layer projections 22 and the upper-layer projections 23 is not necessarily required, but if a projection on one side does not have a corresponding projection on the other side, then the part may be deformed due to a pressure difference of the coating liquids. In that case, a gap will occur between the projection and the die block. This may cause a disturbance of the flowing there, and adversely affects the thickness distribution of the coating film. A plurality of the projection lines is not necessarily required. A single line of the projections aligned horizontally may be disposed at a predetermined distance a from the edge facing the discharge slot. If the coating die has a projection on only one of the upper-layer side and the lower-layer side viewed from the discharge slot (edge of the recess), the shim may be deformed toward one side due to a large pressure difference between the coating liquids. Then the slit size will decrease, and so inhibits the discharging of the coating liquid. The coating die therefore desirably includes a projection line on both of the upper-layer side and the lower-layer side close to the discharge slot.

Figure 10:
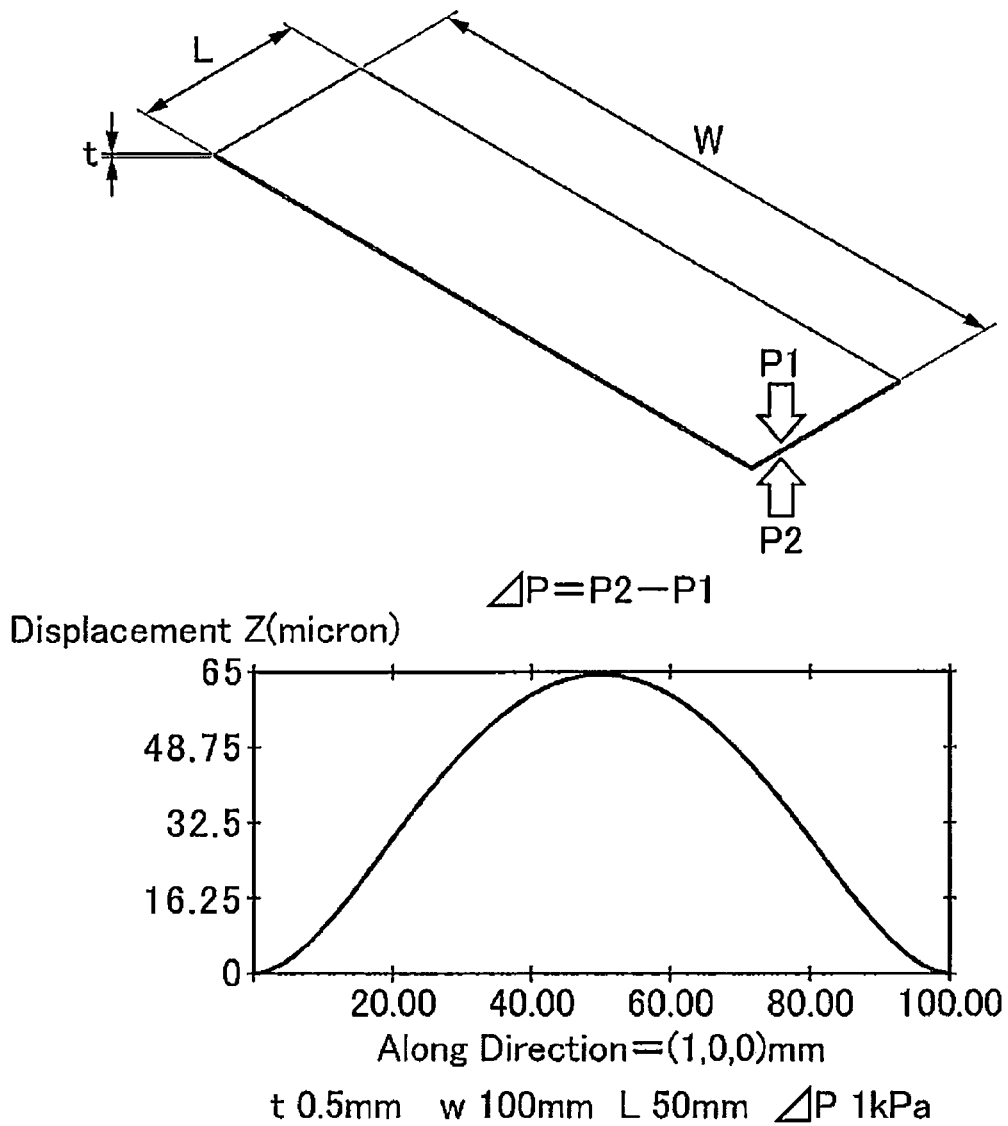
FIG. 10 shows the analysis result for the displacement of a recess in the integrated shim in the first embodiment.
Figure 11:
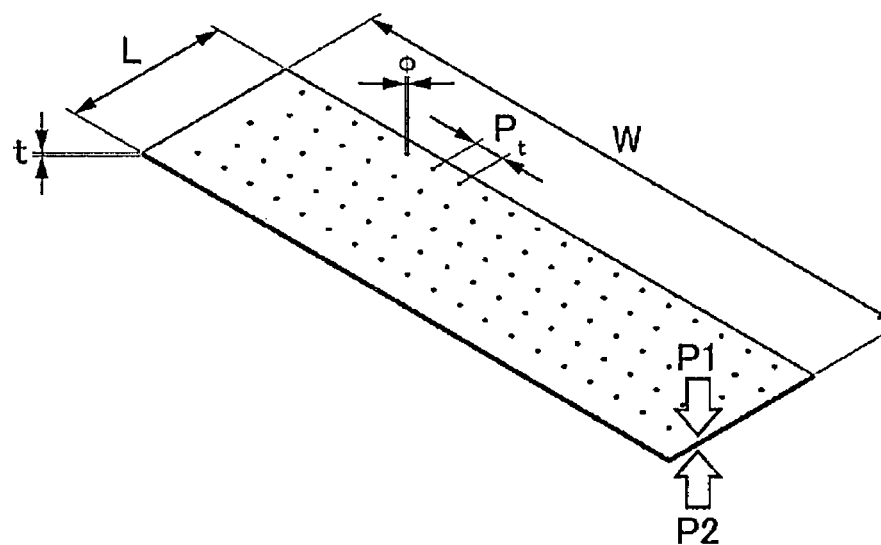
FIG. 11 shows the analysis result for the displacement of a recess in the integrated shim in the second embodiment.
Figure 11:
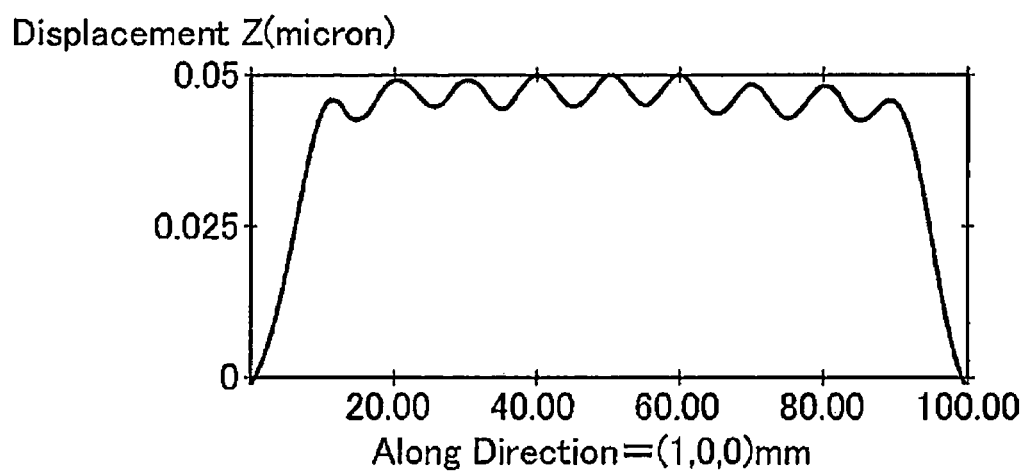

Next the following describes the function of the projections in the recess of the integrated shim 21. FIG. 10 shows the analysis result for the displacement of a recess in the integrated shim 21 in the first embodiment. FIG. 11 shows the analysis result for the displacement of a recess in the integrated shim 21 in the second embodiment. In FIG. 10 and FIG. 11, L denotes the length in the width direction of the dividing part 21c, W denotes the longitudinal length of the dividing part 21c, and t denotes the thickness of the dividing part 21c. P1 denotes pressure of the coating liquid flowing through the upper-layer recess 21a, P2 denotes pressure of the coating liquid flowing through the lower-layer recess 21b, and ΔP denotes a pressure difference between P2 and P1. Z denotes the displacement of the dividing part 21c in the thickness direction when ΔP acts on the dividing part 21c.

In the first embodiment, the recess of the integrated shim 21 is confined with the standing wall of the integrated shim 21 on the three sides other than the edge facing the discharge slot. The discharge slot, i.e., the opening end of the recess is not confined, and a pressure difference, if any, between the upper-layer coating liquid and the lower-layer coating liquid may deform the dividing part 21c. The coating die without projections on the dividing part 21c as in the first embodiment has a largest displacement at a center of the recess opening (e.g., about 65 micron under the conditions of FIG. 10), which corresponds to about 13% of the thickness t of the dividing part 21c. This causes an unstable distribution of the thickness of the coating film in the width direction.

Meanwhile, the coating die of the second embodiment has projections in the recess of the integrated shim 21. These projections function as the supporting pillars to support the dividing part 21c to be flat, and so suppresses the displacement of the dividing part 21c. Under the conditions of FIG. 11, for example, the displacement of the dividing part 21c corresponds to about 0.01% of the thickness t of the dividing part 21c. Comparison with the first embodiment without projections shows that the displacement is suppressed sufficiently that is a remarkable effect of the projections. In this way the coating die with projections has less displacement at the opening end of the recess that is the discharge slot of the coating liquid due to a pressure difference, if any, between the upper-layer coating liquid and the lower-layer coating liquid. The discharging amount of the coating liquids is therefore stable at any position in the longitudinal direction.

As described above in details, the coating die of the first embodiment includes the integrated shim 21 having the recess pattern on the surface and the rear face so as to define the channel of the coating liquids. This eliminates the positioning that is necessary for a coating die including two shims of the upper-layer shim and the lower-layer shim, and so improves the coating accuracy.

The integrated shim 21 includes the lower-layer projections 22 and the upper-layer projections 23 on the lower-layer recess 21b and the upper-layer recess 21a, respectively, so that these projections function as the supporting pillars to support the dividing part 21c to be flat. This configuration suppresses flexural displacement of the recess at the opening end due to a pressure difference between the lower-layer coating liquid and the upper-layer coating liquid, and stabilizes the discharging amount of the coating liquids in the width direction.

The plurality of lower-layer projections 22 and upper-layer projections 23 are aligned with the intervals Pt at a predetermined distance a from the edge of the recess opening in the shim. This suppresses the flowing disturbance at the discharge slot of the coating liquid, and so enables uniform coating of the coating liquid with less distribution of the film thickness in the width direction.

These lower-layer projections 22 and upper-layer projections 23 are horizontally aligned in a plurality of lines with the intervals Pp between the lines, and the lower-layer projections 22 and the upper-layer projections 23 are overlapped at the same position on the surface and the rear face. This stabilizes the flowing of the coating liquids inside of the slits toward the discharge slot, and suppresses the deformation of the dividing part 21c so as to keep enough slit channels for the upper layer and the lower layer. This enables stable formation of the coating film.

Third Embodiment

Figure 13:
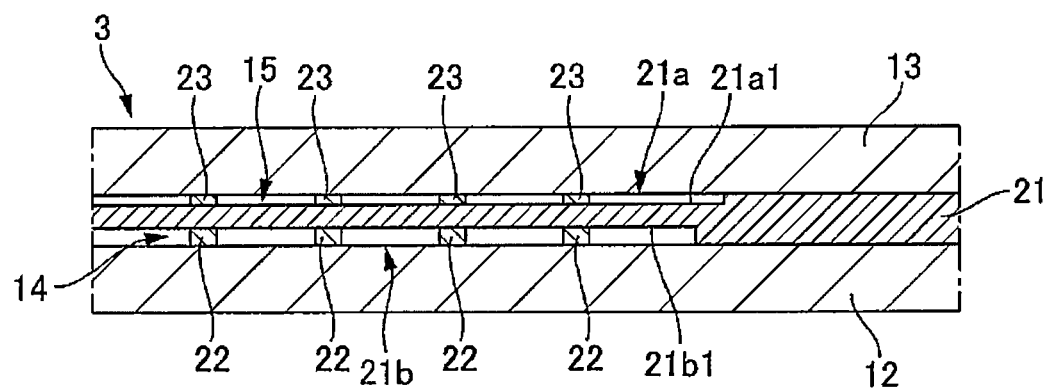
FIG. 13 is an enlarged view of a discharging slot of a two-layer coating die in a third embodiment.

FIG. 13 is an enlarged view of a discharging slot of a two-layer coating die in a third embodiment. This integrated shim 21 includes upper-layer recesses 21a and lower-layer recesses 21b that are substantially opposed on the surface and the rear face of the shim. Similarly to the second embodiment, these lower-layer recess 21a and upper-layer recess 21b have a plurality of lower-layer projections 22 and upper-layer projections 23 on their bottom faces 21b1 and 21a1, respectively. In this embodiment, the projections each have the same width between the proximal end and the distal end in the axial cross section. That is, the protrusion is not a frustum but is a pillar-shaped structure having a pattern formed by machining. Other than this feature, the coating die of this embodiment has the same structure as that of the second embodiment. Like numerals therefore indicate like parts, and their detailed descriptions are omitted.

In the third embodiment, the projections have a pillar-shape and not a frustum-shape. This makes the disturbance of the coating liquid around the projection uniform, and so facilitates cancelling of the disturbance. The present embodiment therefore enables uniform coating of the coating liquid with less distribution of the thickness of the coating film in the width direction as compared with the second embodiment when the distance a from the opening end of the recess, the interval Pt of the projections, and the interval Pp of the projection lines are the same. The other functions and advantageous effects are the same as those of the second embodiment.

Fourth Embodiment

Figure 14:
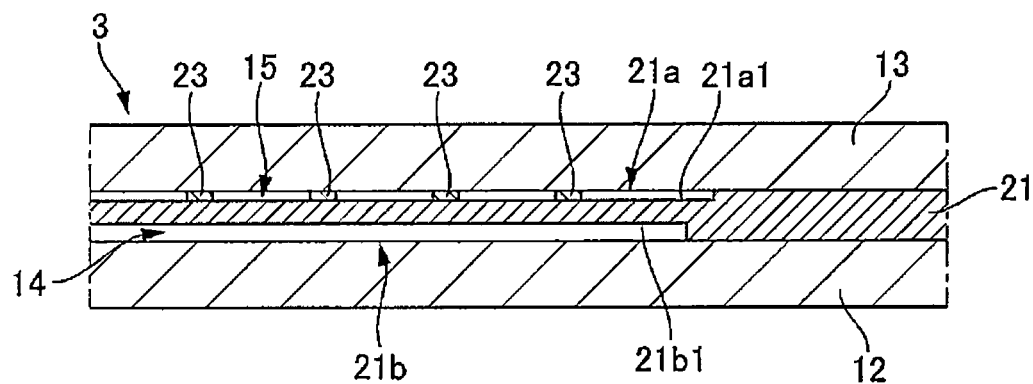
FIG. 14 is an enlarged view of a discharging slot of a two-layer coating die in a fourth embodiment.

FIG. 14 is an enlarged view of a discharging slot of a two-layer coating die in a fourth embodiment. This integrated shim 21 has upper-layer recesses 21a and lower-layer recesses 21b, and these upper-layer recesses 21a and lower-layer recesses 21b are substantially opposed on the surface and the rear face of the integrated shim 21. Projections are disposed in the recess only on a single face of the integrated shim, and the recess on the rear face has no projections. Other than this feature, the coating die of this embodiment has the same structure as that of the second embodiment. Like numerals therefore indicate like parts, and their detailed descriptions are omitted.

For convenience sake, FIG. 14 shows the upper-layer projections 23 in the upper-layer recess 21a only, and no projections in the lower-layer recess 21b. This assumes the case where the pressure of coating liquid in the lower-layer recess 21b is higher than the pressure of coating liquid in the upper-layer recess 21a. In this case, supporting pillars are required only in the direction of pressing the dividing part 21c to suppress displacement of the dividing part 21c. Conversely when the pressure of coating liquid in the upper-layer recess 21a is higher than the pressure of coating liquid in the lower-layer recess 21b, a preferable configuration includes the lower-layer projections 22 in the lower-layer recess 21b, and no projections in the upper-layer recess 21a.

The fourth embodiment includes the projections in the recess on a single face only, and no projections in the recess on the rear face. The face without projections does not disturb the flowing of the coating liquid and so enables uniform coating of the coating liquid with less distribution of the thickness of the coating film in the width direction. This also simplifies the configuration of the integrated shim 21, and so reduces the cost to form the integrated shim 21. The other functions and advantageous effects are the same as those of the second embodiment.

Fifth Embodiment

Figure 15:
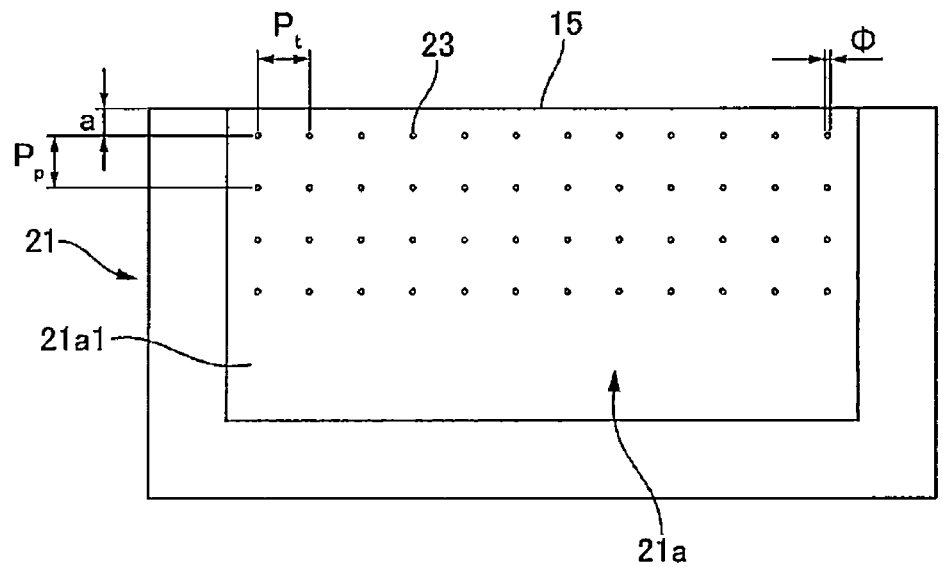
FIG. 15 is an enlarged plan view of the arrangement of projections in one of the recesses of the integrated shim in a fifth embodiment.

FIG. 15 is an enlarged plan view of the arrangement of the projections in one of the recesses of the integrated shim in a fifth embodiment. This integrated shim 21 has a recess, and the recess includes a plurality of projections that are aligned horizontally in a plurality of lines on the bottom face. A first line of the projections is formed at a predetermined distance a from the edge facing the discharge slot to have the interval Pt between the adjacent projections. Although the intervals between the plurality of projection lines are Pp that is the same as the intervals of the second embodiment, these horizontal lines are not arranged in a staggered manner unlike the second embodiment. That is, n-th projections in each horizontal line are aligned linearly in the vertical direction as well. Other than this feature, the coating die of this embodiment has the same structure as that of the second embodiment. Like numerals therefore indicate like parts, and their detailed descriptions are omitted. For convenience sake, FIG. 15 shows the upper-layer projections 23 in the upper-layer recess 21a, and the lower-layer recess 21b also has lower-layer projections having a similar configuration.

Such a linearly arranged projections in both of the horizontal and vertical directions of the fifth embodiment make the disturbance of the coating liquid around the projections uniform and make its cancellation uniform over the entire region having such projections, and so enables uniform coating of the coating liquid with less distribution of the thickness of the coating film in the width direction. The other functions and advantageous effects are the same as those of the second embodiment.

Sixth Embodiment

Figure 16:
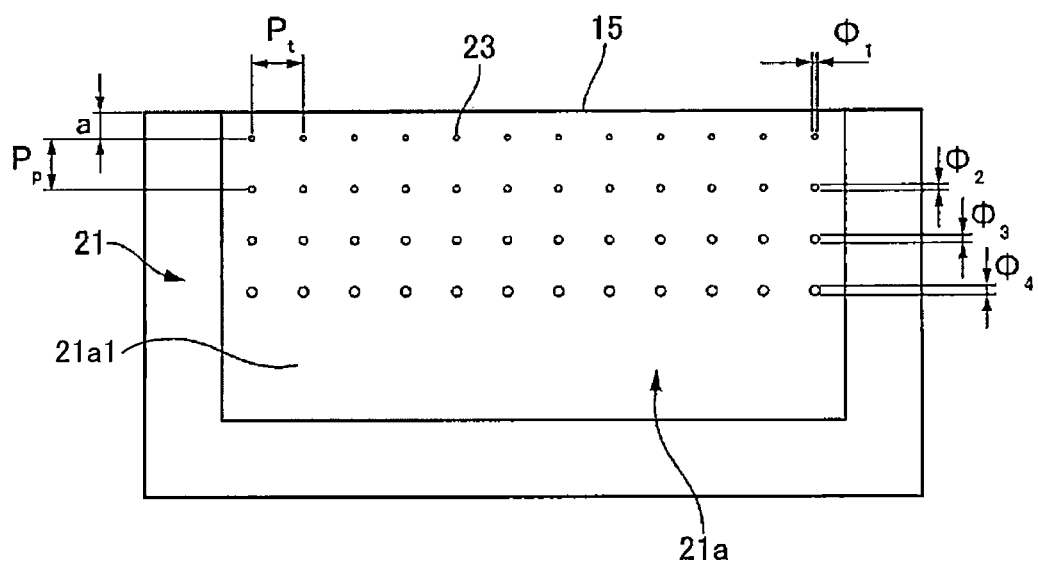
FIG. 16 is an enlarged plan view of the arrangement of projections in one of the recesses of the integrated shim in a sixth embodiment.

FIG. 16 is an enlarged plan view of the arrangement of the projections in one of the recesses of the integrated shim in a sixth embodiment. This integrated shim 21 has a recess, and the recess includes a plurality of projections on the bottom face. In this embodiment, the diameter of the projections changes line by line from the edge facing the discharge slot of the recess toward the bottom in the drawing. Other than this feature, the coating die of this embodiment has the same structure as that of the second embodiment. Like numerals therefore indicate like parts, and their detailed descriptions are omitted. For convenience sake, FIG. 16 shows the upper-layer projections 23 in the upper-layer recess 21a, and the lower-layer recess 21b also has lower-layer projections 22 having a similar configuration. In the sixth embodiment, the diameter of the projections in the lines is large at a part in proximity to the manifold of the die where the dividing part 21c receives a large pressure, i.e., the diameter gradually increases from the edge facing the discharge slot of the recess toward the bottom in the drawing. In another example, the projections have a larger diameter only in the lowest line receiving the largest pressure or in a few lines near the lowest line.

Such a sixth embodiment includes the projections near the discharge slot of the recess having a smaller diameter and the projections in the lines near the manifold of the die having a larger diameter because the dividing part 21c at this part receives a larger pressure. This configuration suppresses the disturbance of the coating liquid around the projections near the discharge slot and suppress the deformation of the dividing part 21c more, and so enables uniform coating of the coating liquid with less distribution of the thickness of the coating film in the width direction. The other functions and advantageous effects are the same as those of the second embodiment.

Seventh Embodiment

Figure 17:
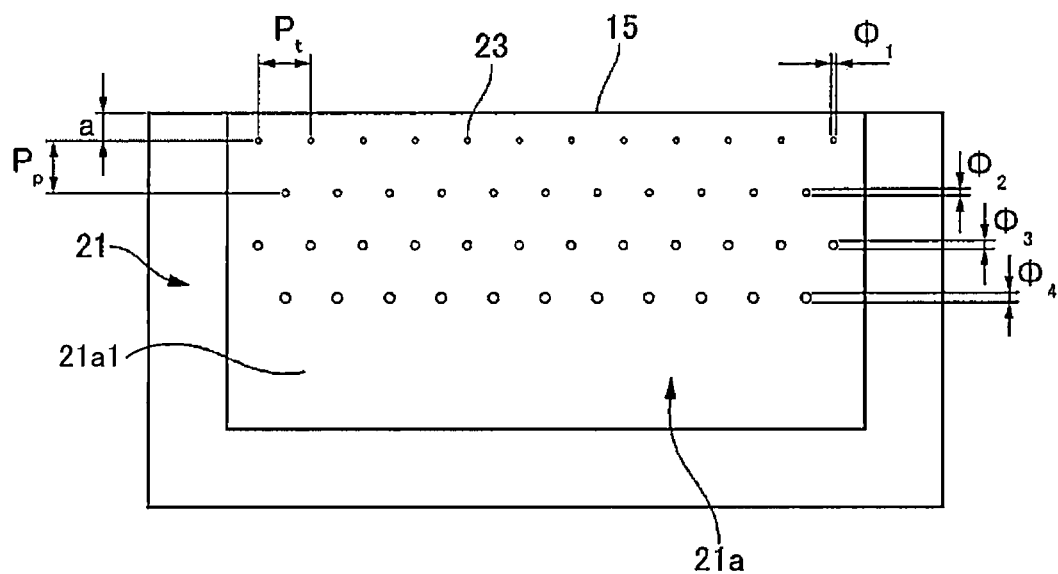
FIG. 17 is an enlarged plan view of the arrangement of projections in one of the recesses of the integrated shim in a seventh embodiment.

FIG. 17 is an enlarged plan view of the arrangement of the projections in one of the recesses of the integrated shim in a seventh embodiment. This integrated shim 21 has a recess, and the recess includes a plurality of projections on the bottom face. This embodiment has the same configuration as that of the sixth embodiment in that the diameter of the projections changes line by line from the edge facing the discharge slot of the recess toward the bottom in the drawing. This embodiment differs from the sixth embodiment in that the projection lines are arranged in a staggered manner. For convenience sake, FIG. 17 shows the upper-layer projections 23 in the upper-layer recess 21a, and the lower-layer recess 21b also has lower-layer projections 22 having a similar configuration. In the seventh embodiment, the diameter of the projections in the lines is large at a part in proximity to the manifold of the die where the dividing part 21c receives a large pressure, i.e., the diameter gradually increases from the edge facing the discharge slot of the recess toward the bottom in the drawing. In another example, the projections have a larger diameter only in the lowest line receiving the largest pressure or in a few lines near the lowest line.

Such a seventh embodiment includes the projections near the discharge slot of the recess having a smaller diameter and the projections in the lines near the manifold of the die having a larger diameter because the dividing part 21c at this part receives a larger pressure. This configuration suppresses the disturbance of the coating liquid around the projections near the discharge slot and suppress the deformation of the dividing part 21c of the integrated shim 21 more, and so enables uniform coating of the coating liquid with less distribution of the thickness of the coating film in the width direction. The other functions and advantageous effects are the same as those of the second embodiment.

Eighth Embodiment

Figure 18:
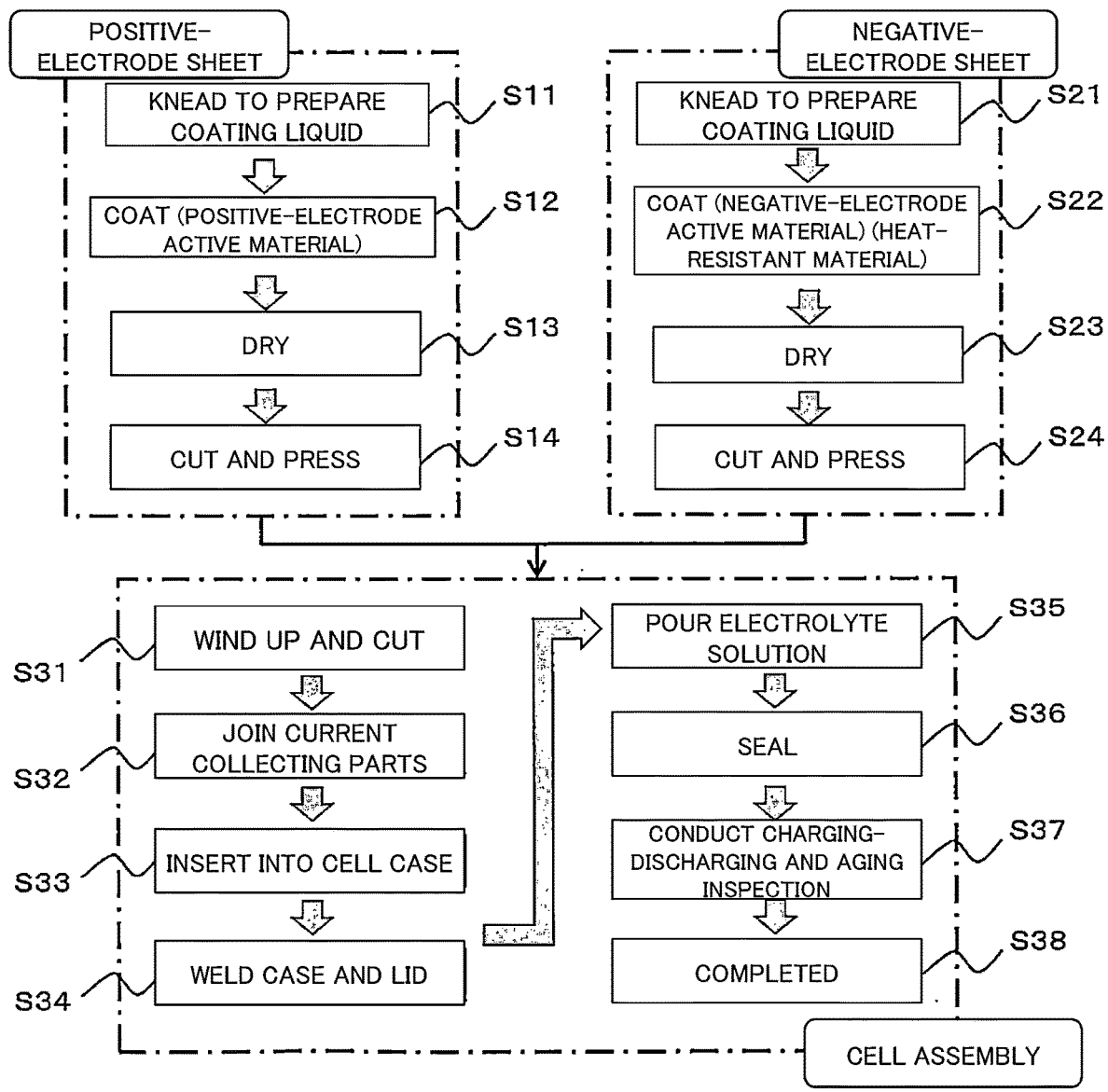
FIG. 18 is a flowchart showing a method for manufacturing a lithium-ion cell that is an eighth embodiment.

The following describes a method for manufacturing a lithium-ion cell. FIG. 18 is a flowchart showing a method for manufacturing a lithium-ion cell that is an eighth embodiment. This embodiment describes a lithium-ion cell as one example, and the manufacturing method of this embodiment is applicable to other secondary cells as well having the configuration similar to a lithium-ion cell. This embodiment describes a heat-resistant layer formed on a negative electrode, and a heat-resistant layer may be formed on a positive electrode.

Firstly for a positive electrode sheet (first electrode sheet), a positive-electrode active material, a conducting material, and a binder are kneaded with a dispersing medium to prepare a slurry-form coating liquid including the positive-electrode active material (Step S11). Examples of the positive-electrode active material include lithium cobaltite (LiCoO$_2$), lithium manganate (LiMn$_2$O$_4$), and lithium nickelate (LiNiO$_2$). Examples of the conducting material include carbon materials, such as carbon black, acetylene black, graphite, carbon fiber, and carbon nanotube. Examples of the binder include polyvinylidene fluoride (PVDF). Examples of the dispersing medium include N-methylpyrrolidone (NMP).

Next the coating liquid including the positive-electrode active material is applied by a coating device to the surface of aluminum foil (first substrate to be coated) as a positive-electrode current collector (Step S12). Subsequently the aluminum foil with the coating liquid coated thereon is dried in a drying oven (Step S13). Next, the aluminum foil with the coating liquid coated thereon is cut, and is pressed by a pressing machine to densify a positive-electrode active material layer (first active-material layer) including the positive-electrode active material (Step S14). In this way, a positive-electrode sheet is formed.

Subsequently for a negative electrode sheet (second electrode sheet), a negative-electrode active material (second active material) and a binder are kneaded with a dispersing medium to prepare a slurry-form coating liquid including the negative-electrode active material (Step S21). Examples of the negative-electrode active material include carbon materials, such as natural graphite, artificial graphite, easily-graphitized carbon, and non-graphitizable carbon. Examples of the binder include rubber-based polymer, such as styrene-butadiene rubber (SBR), which is used with water-based solvent, or include organic binders, such as polyvinylidene fluoride (PVDF), which is used with polar solvent, such as N-methylpyrrolidone (NMP). In addition to the binder, a thickener may be used to adjust the viscosity of the coating liquid. Preferable examples of the thickener include carboxymethylcellulose together with styrene-butadiene rubber (SBR).

Next the coating liquid including the negative-electrode active material and the coating liquid including a heat-resistant material, such as heat-resistant resin, are applied concurrently to be stacked in the form of laminae by the coating device including the coating die shown in the above First to Seventh Embodiments on the surface of copper foil (second substrate to be coated) as a negative-electrode current collector (Step S22). At this step, the lower-layer discharge slot 14 of the two-layer coating die 3 shown in FIG. 2 discharges the coating liquid including the negative-electrode active material, and the upper-layer discharge slot 15 discharges the coating liquid including the heat-resistant material.

Subsequently the copper foil with the coating liquids coated thereon is dried in a drying oven (Step S23). Next, the copper foil with the coating liquids coated thereon is cut, and is pressed by a pressing machine to densify the negative-electrode active material (Step S24). In this way, a negative-electrode sheet is formed.

Figure 19:
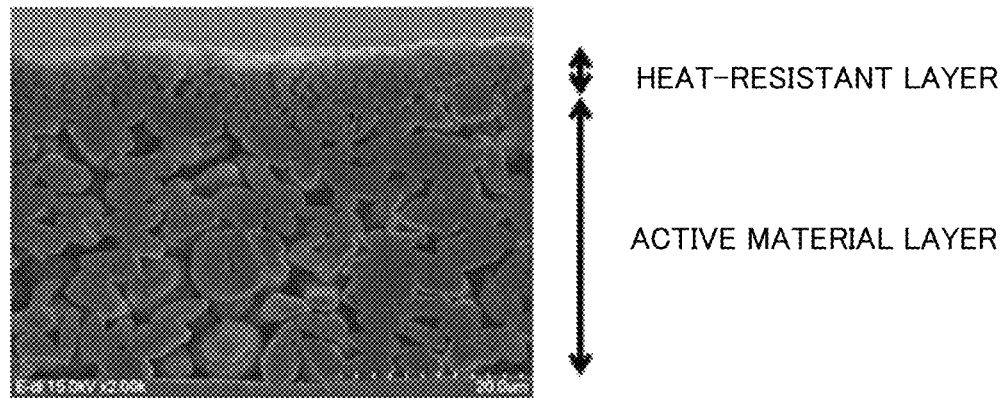
FIG. 19 is a cross-sectional view of the negative-electrode active material layer and the heat-resistant layer of a negative-electrode sheet in the eighth embodiment.

FIG. 19 shows the cross-sectional structure of the negative-electrode active material layer (second active-material layer) including the negative-electrode active material and the heat-resistant layer including the heat-resistant material. In FIG. 19, the heat-resistant layer is thinner than the negative-electrode active material layer. This improves the safety of the cell without degrading the performance, and suppresses the material cost.

The following cell assembly step stacks the positive-electrode sheet and the negative-electrode sheet alternately while intervening an insulating separator between the sheets, winds up this laminate into an electrode roll, and cuts the electrode roll into a required length (Step S31).

Figure 20:
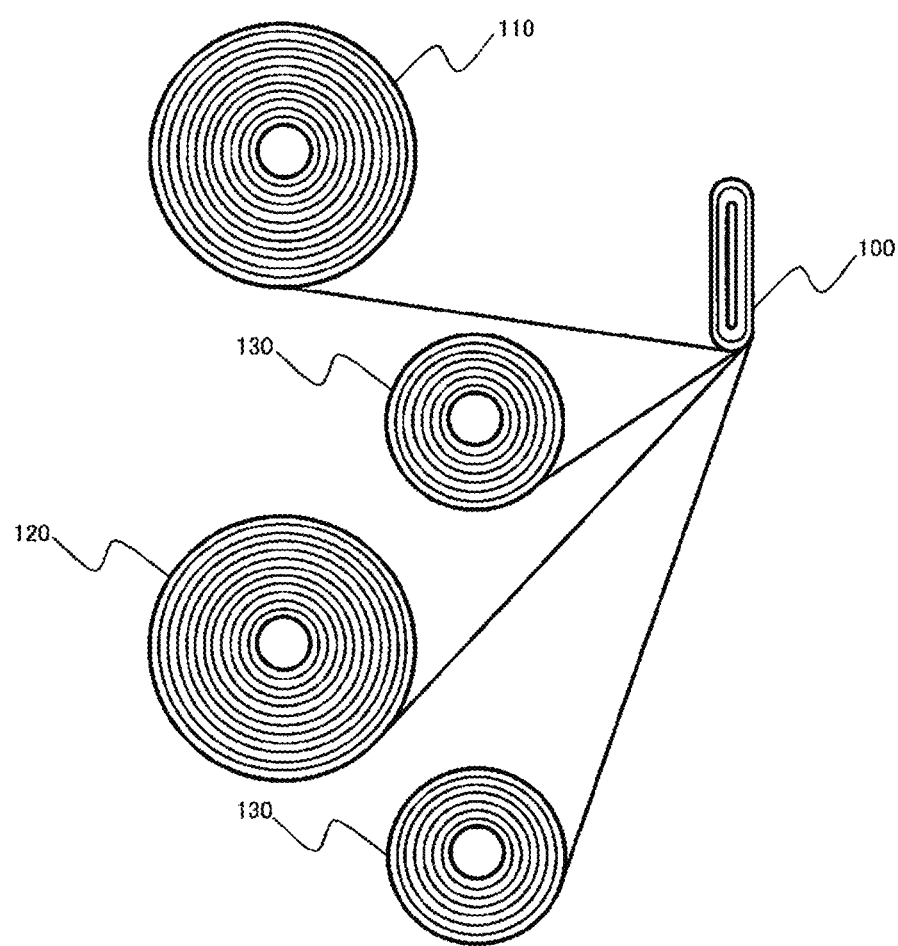
FIG. 20 is a cross-sectional view showing one aspect of the electrode winding-up step in the eighth embodiment.
Figure 21:
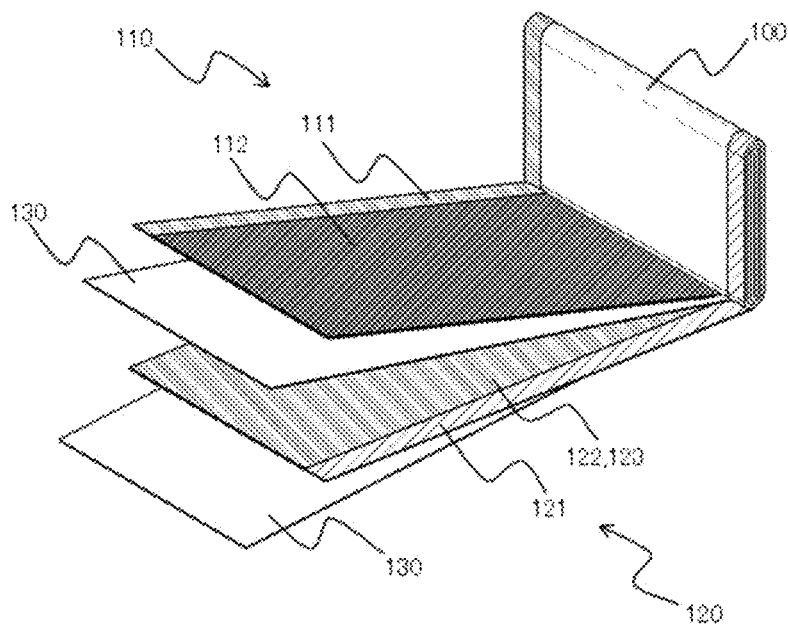
FIG. 21 is a perspective view showing the electrode roll in the eighth embodiment.

FIG. 20 is a cross-sectional view showing one aspect of the electrode winding-up step in the eighth embodiment. FIG. 21 is a perspective view showing the electrode roll in the eighth embodiment. In FIG. 20 and FIG. 21, the electrode roll 100 includes the positive-electrode sheet 110 and the negative-electrode sheet 120 stacked alternately while intervening a separator 130 between the sheets. The positive-electrode sheet 110 includes the aluminum foil 111 and the positive-electrode active material layer 112 on the aluminum foil 111, and the negative-electrode sheet 120 includes the copper foil 121, and the negative-electrode active material layer 123 and the heat-resistant layer 122 on the copper foil.

Figure 22:
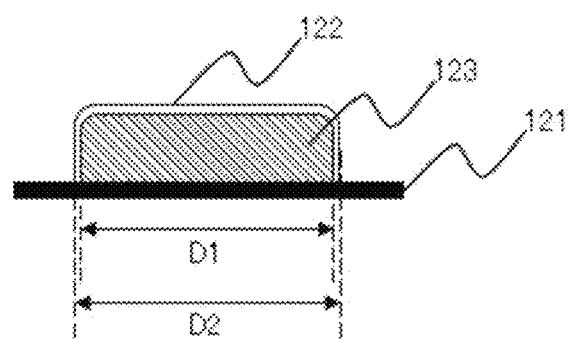
FIG. 22 is a cross-sectional view of the second electrode sheet in the eighth embodiment taken along the direction orthogonal to the stacking direction of the coating die and the longitudinal direction of the coating die.

FIG. 22 is a cross-sectional view of the second electrode sheet in the eighth embodiment taken along the direction orthogonal to the stacking direction of the coating die and the longitudinal direction of the coating die. As shown in FIG. 22, the coating width D1 of the negative-electrode active material layer 123 (length of the negative-electrode active material layer 123 viewed from the longitudinal direction of the coating die) is shorter than the coating width D2 of the heat-resistant layer 122 (length of the heat-resistant 122 viewed from the longitudinal direction of the coating die), and both ends of the coating width of the negative-electrode active material layer 123 are covered with the heat-resistant layer 122 having the overlapping thickness of 1.5 mm to 2.0 mm, for example. This prevents short-circuit between the positive-electrode active material layer and the negative-electrode active material layer, and degradation of the cell performance due to heat.

For the configuration including the positive-electrode active material layer having the coating width shorter than that of the negative-electrode active material layer, the heat-resistant layer does not always have to cover the entire region of the coating width including both ends of the negative-electrode active material layer. In this case, the coating width of the heat-resistant layer may have a length that covers the coating width of the positive-electrode active material layer and is longer than the length of the positive-electrode active material layer. This also prevents short-circuit between the positive-electrode active material layer and the negative-electrode active material layer, and degradation of the cell performance due to heat.

The coating width of the negative-electrode active material layer may be the same as the coating width of the heat-resistant layer. As shown in FIG. 3, the upper-layer recesses 21a and the lower-layer recesses 21b on the surface and the rear face of the integrated shim 21 improve the positioning accuracy between the negative-electrode active material layer and the heat-resistant layer, and so prevents short-circuit between the positive-electrode active material layer and the negative-electrode active material layer and degradation of the cell performance due to heat.

Figure 23:
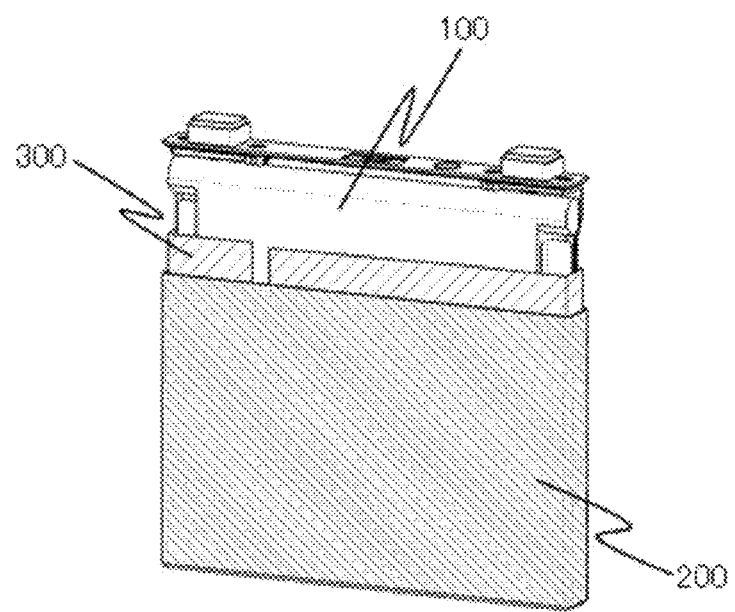
FIG. 23 is a perspective view showing the cell case in the eighth embodiment.

Subsequently, current collecting parts of the electrode roll are joined to the positive and negative electrode current collecting plates (Step S32), which is then inserted into a cell case (Step S33). FIG. 23 is a perspective view showing the cell case in the eighth embodiment. FIG. 23 shows the cell case 200, into which the electrode roll 100 surrounded with the insulating sheet 300 is inserted.

Subsequently, the cell case is joined to a cell lid by laser welding, for example (Step S34). Electrolyte solution is poured into the cell case (Step S35). An inlet to pour the electrolyte solution is closed by laser welding, for example, to seal the cell case (Step S36). After that, charging-discharging and aging inspection are conducted (Step S37), and a lithium-ion cell is completed (Step S38).

The above-stated method for manufacturing a lithium-ion cell in the eighth embodiment forms a negative-electrode sheet by the two-layer coating die 3 including the integrated shim 21 having the upper-layer recesses 21a and the lower-layer recesses 21b on the surface and the rear face. This eliminates the positioning that is necessary for a coating die including the upper-layer shim and the lower-layer shim, and so reduces the number of assembly steps and improves the positioning accuracy between the negative-electrode active material layer and the heat-resistant layer.

That is a description on the embodiments of the present invention. The specific configuration of the present invention is not limited to the above-stated embodiments, and the design may be modified variously without departing from the spirits of the present disclosure. The present disclosure also covers such modified embodiments.

The present invention also includes the following forms.
[Form 1]

A coating die configured to discharge a coating liquid on a belt-like substrate to be coated that moves in a longitudinal direction (winding-up direction of the substrate in this form), includes:
    a first block and a second block each including a manifold to receive a coating liquid; and a shim sandwiched between the first block and the second block to define a slit to discharge the coating liquid, the shim having recesses each having an edge facing a discharge slot of the slit and peripheral parts other than the edges on the surface and the rear face, the recesses defining a part of a passage channel of the coating liquid.

[Form 2]

In the coating die according to Form 1, the recesses at least on a low-pressure side of the coating liquid each have a plurality of projections on the bottom face, the plurality of projections having a height that is substantially a same dimension as a depth of the recesses.

[Form 3]

In the coating die according to Form 2, the plurality of projections are arranged in a line in the width direction of the discharge slot of the coating liquid.

[Form 4]

In the coating die according to Form 3, the projections are arranged in a plurality of lines along the width direction of the discharge slot of the coating liquid.

[Form 5]

In the coating die according to Form 4, among the plurality of lines of the projections, the projections in a first line close to the discharge slot of the coating liquid have a dimension in the width direction along the flowing direction of the coating liquid that is smaller than that of the projections in other lines.

[Form 6]

In the coating die according to Form 4, the plurality of lines of the projections are arranged in a staggered manner by displacing the lines.

[Form 7]

In the coating die according to Form 3, the projections are arranged at least at a position other than the edge of the discharge slot of the coating liquid.

[Form 8]

In the coating die according to Form 1, both of the recesses on the surface and the rear face of the shim have a plurality of projections on their bottom faces, the plurality of projections having a height that is substantially a same dimension as a depth of the recesses, and the projections on the surface and the projections on the rear face are overlapped at mutually opposed positions.

[Form 9]

In the coating die according to Form 3, the projections each have a cross section that decreases from the proximal end to the distal end.

[Form 10]

In the coating die according to Form 3, the projections have an overall cross-sectional area that is larger on the face where the discharged coating liquid has lower viscosity than on the face where the discharged coating liquid has higher viscosity.

[Form 11]

In the coating die according to Form 1, the recesses are deeper on the face where the discharged coating liquid has higher viscosity than on the face where the discharged coating liquid has lower viscosity.

[Form 12]

A coating method for coating a coating liquid on a face of a substrate to be coated using the coating die according to any one of Forms 1 to 13.

[Form 13]

A coating device comprising: a conveying means having a plurality of rolls configured to convey a belt-like substrate to be coated;

a coating die configured to discharge a coating liquid for coating on a substrate to be coated that is conveyed by the conveying means;

a die drive mechanism configured to drive the coating die;

a tank storing the coating liquid; and a pump and a tube configured to supply the coating liquid to the die, the coating die includes a first block and a second block each including a manifold to receive a coating liquid; and a shim sandwiched between the first block and the second block to define a slit to discharge the coating liquid, the shim having recesses each having an edge facing a discharge slot of the slit and peripheral parts other than the edges on the surface and the rear face, the recesses defining a part of a passage channel of the coating liquid.

REFERENCE SIGNS LIST

1 Substrate
2 Back roll
3 Two-layer coating die
4 Die base
5 Die drive mechanism
6 Lower-layer coating liquid tank
7 Lower-layer pump
8 Lower-layer feeding tube
9 Upper-layer coating liquid tank
10 Upper-layer pump
11 Upper-layer feeding tube
12 Lower block
12a Lower-layer coating liquid feeding port
12b Lower-layer manifold
13 Upper block
13a Upper-layer coating liquid feeding port
13b Upper-layer manifold
14 Lower-layer discharge slot (discharge slot)
15 Upper-layer discharge slot (discharge slot)
16 Lower-layer coating film
17 Upper-layer coating film
21 Integrated shim
21a Upper-layer recess
21a1 Upper-layer recess bottom face
21b Lower-layer recess
21b1 Lower-layer recess bottom face
21c Dividing part
22 Lower-layer projection
23 Upper-layer projection
100 Electrode roll
110 Positive-electrode sheet
111 Aluminum foil
112 Positive-electrode active material layer
120 Negative-electrode sheet
121 Copper foil
122 Heat-resistant layer
123 Negative-electrode active material layer
130 Separator
131 Substrate
200 Cell case
300 Insulating sheet
CU Control unit

The invention claimed is:

1. A method for manufacturing a secondary cell, comprising: manufacturing a first electrode sheet by forming a first active material layer on a surface of a first substrate to be coated;

manufacturing a second electrode sheet by forming a second active material layer on a surface of a second substrate to be coated, and forming a heat-resistant layer on the second active material layer; and stacking the first electrode sheet and the second electrode sheet alternately while intervening an insulating separator between the sheets, the manufacturing of the second electrode sheet including:

preparing a coating die, the coating die including: a first block including a first manifold to receive a heat-resistant material; a second block including a second manifold to receive a second active material; and a shim sandwiched between the first block and the second block, the shim including a first recess on a face of the shim facing the first block, the first recess communicating with the first manifold, and a second recess on a face of the shim facing the second block, the second recess communicating with the second manifold, the first recess having one end of a short side of the shim that is open to define a first discharge slot to discharge the heat-resistant material, the second recess having one end of the short side of the shim, the one end of the second recess being open to define a second discharge slot to discharge the second active material, the manufacturing of the second electrode sheet further including:

discharging the heat-resistant material and the second active material through the first discharge slot and the second coating discharge slot, respectively; and applying the second active material and then the heat-resistant material concurrently on a surface of the second substrate to be coated while stacking the second active material and the heat-resistant material in a laminar form.

2. The method for manufacturing a secondary cell according to claim 1, wherein the second discharge slot has a length in a longitudinal direction of the shim that is shorter than a length of the first discharge slot in the longitudinal direction, the first discharge slot covers entirely the second discharge slot in the longitudinal direction.

3. The method for manufacturing a secondary battery according to claim 1, wherein the heat-resistant material and the second active material with mutually different pressures are supplied to the first manifold and the second manifold, respectively, the shim includes a plurality of projections on the first recess, the projections having a height that is a substantially same dimension as a depth of the first recess, and/or a plurality of projections on the second recess, the projections having a height that is a substantially same dimension as a depth of the second recess, and the plurality of projections on at least one of the first recess and the second recess is on the first recess or the second recess where at least one of the heat-resistant material and the second active material with a lower pressure travels.

4. The method for manufacturing a secondary battery according to claim 1, wherein the heat-resistant material and the second active material with mutually different pressures are supplied to the first manifold and the second manifold, respectively, the shim includes a plurality of projections on the first recess, the projections having a height that is a substantially same dimension as a depth of the first recess, and/or a plurality of projections on the second recess, the projections having a height that is a substantially same dimension as a depth of the second recess, and the plurality of projections on at least one of the first recess and the second recess is on the first recess or the second recess where at least one of the heat-resistant material and the second active material with a lower pressure travels.

* * * * *